United States Patent
Colombo et al.

(10) Patent No.: US 10,814,313 B2
(45) Date of Patent: Oct. 27, 2020

(54) METHOD FOR THE PREPARATION OF METAL OXIDE HOLLOW NANOPARTICLES

(71) Applicants: FONDAZIONE ISTITUTO ITALIANO DI TECNOLOGIA, Genoa (IT); UNIVERSITA' DEGLI STUDI DI GENOVA, Genoa (IT)

(72) Inventors: Massimo Colombo, Monticello Brianza (IT); Chunzheng Wu, Zhejiang (CN); Liberato Manna, Genoa (IT)

(73) Assignees: Fondazione Istituto Italiano Di Tecnologia (IT); Universita' Degli Studi Di Genova (IT)

( * ) Notice: Subject to any disclaimer, the term of this patent is extended or adjusted under 35 U.S.C. 154(b) by 357 days.

(21) Appl. No.: 15/769,830

(22) PCT Filed: Oct. 27, 2016

(86) PCT No.: PCT/IB2016/056483
§ 371 (c)(1),
(2) Date: Apr. 20, 2018

(87) PCT Pub. No.: WO2017/072701
PCT Pub. Date: May 4, 2017

(65) Prior Publication Data
US 2020/0246780 A1   Aug. 6, 2020

(30) Foreign Application Priority Data

Oct. 27, 2015  (IT) .................. 102015000065955

(51) Int. Cl.
*B01J 23/89*  (2006.01)
*B01J 21/08*  (2006.01)
(Continued)

(52) U.S. Cl.
CPC .......... *B01J 23/8986* (2013.01); *B01J 21/08* (2013.01); *B01J 21/18* (2013.01); *B01J 23/34* (2013.01);
(Continued)

(58) Field of Classification Search
CPC ........ B01J 23/8986; B01J 21/08; B01J 21/18; B01J 23/34; B01J 23/8892; B01J 35/0013;
(Continued)

(56) References Cited

U.S. PATENT DOCUMENTS

2005/0056118 A1   3/2005 Xia et al.

FOREIGN PATENT DOCUMENTS

| WO | 2012123435 A1 | 9/2012 | |
| WO | WO-2014104805 A1 * | 7/2014 | .............. B01J 21/18 |
| WO | WO-2014148823 A1 * | 9/2014 | .............. C01G 45/02 |

OTHER PUBLICATIONS

PCT International Search Report and Written Opinion for PCT Patent Application No. PCT/IB2016/056483 dated Feb. 3, 2017. (11 pages).
(Continued)

*Primary Examiner* — Coris Fung
*Assistant Examiner* — Michael Forrest
(74) *Attorney, Agent, or Firm* — McAndrews, Held & Malloy, Ltd.

(57) ABSTRACT

The present invention concerns a method for the preparation of metal oxide hollow nanoparticles comprising the steps of: —providing an aqueous suspension of nanoparticles of an oxide of a first element having at least two oxidation states coupled with a substrate; —placing in contact the aqueous suspension with an aqueous solution of a salt of a second element having at least two oxidation states having a standard reduction potential lower than the standard reduction
(Continued)

potential of said first transition metal to obtain hollow nanoparticles.

6 Claims, 6 Drawing Sheets

(51) Int. Cl.
  *B01J 21/18* (2006.01)
  *B01J 23/889* (2006.01)
  *B01J 37/02* (2006.01)
  *B01J 35/00* (2006.01)
  *B01J 37/00* (2006.01)
  *B01J 23/34* (2006.01)

(52) U.S. Cl.
  CPC ....... *B01J 23/8892* (2013.01); *B01J 35/0013* (2013.01); *B01J 37/0072* (2013.01); *B01J 37/0221* (2013.01); *B01J 37/0228* (2013.01)

(58) Field of Classification Search
  CPC  B01J 37/0072; B01J 37/0221; B01J 37/0228; C01G 45/02; C01G 49/08; C01G 51/04
  See application file for complete search history.

(56) References Cited

OTHER PUBLICATIONS

M. H. Oh et al., "Galvanic Replacement Reactions in Metal Oxide Nanocrystals", Science, vol. 340, No. 6135, May 24, 2013, pp. 964-968.

Yugang Sun et al., "Template-Engaged Replacement Reaction: A One-Step Approach to the Large-Scale Synthesis of Metal Nanostructures with Hollow Interiors", Nano Letters, vol. 2, No. 5, May 1, 2002, pp. 481-485.

Hong Xun et al., "Synthesis, Properties and Applications of One- and Two-Dimensional Gold Nanostructures", Nano Research, Tsinghua University Press, CN, vol. 8, No. 1, Dec. 3, 2014, pp. 40-55.

Kwangjin An, et al., "Synthesis and Biomedical Applications of Hollow Nanostructures", Nano Today, Elsevier, Amsterdam, NL, vol. 4, No. 4, Aug. 1, 2009, pp. 359-373.

* cited by examiner

---- Theoretical curve
—— Experimental curve

METHOD FOR THE PREPARATION OF METAL OXIDE HOLLOW NANOPARTICLES

The present application is filed pursuant to 35 U.S.C. 371 as a U.S. National Phase application of International Application No. PCT/IB2016/056483, which was filed on Oct. 27, 2016, and claims priority to Italian Patent Application No. 102015000065955, which was filed with the Italian Patent Office on Oct. 27, 2015. The entire text of the aforementioned applications are incorporated by reference in their entirety.

TECHNICAL FIELD

The present invention concerns a method for the preparation of metal oxide nanoparticles with hollow structure.

BACKGROUND ART

Metal oxide nanoparticles with hollow structure and controlled composition can be potentially applied in the field of catalysis, magnetism and medicine. So far, their preparation has been based on the use of colloidal methods; in particular, a synthesis method of colloids of hollow particles with controlled composition based on a galvanic replacement reaction [1] has recently been particularly successful.

This type of reaction entails a corrosion process guided by the electrochemical potential difference between two metal species. In fact, according to the galvanic replacement method, a first oxide of a transition metal is replaced by a second metal ion with a lower reduction potential then the first one so as to form oxide hollow nanostructures with various compositions. The cavities form due to the oxidative dissolution of metal oxide nanocrystals, which are used as a reactive template.

The driving force of the reaction is the difference in reduction potential between two metals, with a first metal acting mainly as oxidising agent (cathode) and the salt of a second metal which acts as a reducing agent (anode).

Typically, the metallic nanostructures of the cathode are synthesised first. These are subsequently brought into contact with a solution containing the cations of anodic metal to perform the reaction [2]. In particular, Oh et al. describes a method for the preparation of hollow metal nanoparticles in which an organic suspension of nanoparticles of a first transition metal is placed in contact with an aqueous solution of an ion of a second transition metal having lower reduction potential than the first transition metal.

When this method is applied to the synthesis of metal oxide hollow nanostructures, using as starting material a colloidal solution of metal oxide nanoparticles, disadvantageously the use of non-ionic surfactants is necessary to stabilize the nanoparticles in non-polar organic solvents and to avoid the formation of aggregates which prevent correct progression of the galvanic replacement reaction. This makes interaction of the aqueous solution of the second metal ion with the oxide nanoparticles more difficult, limiting the scale of the reaction due to complex reaction conditions and reducing the kinetics of the replacement reaction.

A common problem in the synthesis of nanomaterials is the use of surfactants that have high costs and are toxic. Efforts to reduce the use of these molecules have been made also in the field of the preparation of metal oxide hollow nanoparticles, due to their increasing application as chemical reactors in nanoscale high-performance catalysts, drug release systems, materials for lithium batteries, optical components and for biomedical applications.

Wang et al. describes a method for the synthesis of hollow spheres of $Cu_2O$ via a simple method in aqueous solution at different temperatures, without the addition of a surfactant.

In the work cited, the starting reagents are $Cu_2SO_4 \cdot 5H_2O$ and $N_2H_4$—$H_2O$. However, this method does not exploit a galvanic replacement and makes use of hydrazine, which is highly toxic and carcinogenic [3].

DISCLOSURE OF INVENTION

The object of the present invention is therefore to provide a new method for the preparation of metal oxide hollow nanoparticles which are without the drawbacks of the methods of the known art.

Said object is achieved by the present invention, which relates to a method according to claim 1.

In particular, the method according to the present invention allows the preparation of metal oxide hollow nanoparticles without resorting to the use of surfactants, organic solvents and toxic substances.

In this text, the term "hollow metallic nanoparticles" indicates particles with dimensions between 5 and 200 nm. Said term includes both nanocages, having a hollow heart surrounded by porous walls, and nanocontainers having a hollow heart surrounded by non-porous walls.

In this text, the term "element having at least two oxidation states" indicates an element having at least two oxidation states different from zero, preferably selected from the group consisting of the d-block elements of the periodic table, cerium, lead and tin.

In this text, the term "substrate" indicates a substrate produced in a material having a specific surface area greater than $1\ m^2/g$, preferably having a porous structure with pore diameter less than 10 micron. Furthermore, the substrate is in particle form and, once coupled with the metal oxide nanoparticles, forms particles having dimensions ranging from 200 nm to 500 micron.

According to the present invention a method is provided for the preparation of metal oxide hollow nanoparticles comprising the steps of:
  providing an aqueous suspension of nanoparticles of an oxide of a first element having at least two oxidation states coupled with a substrate;
  bringing the aqueous solution into contact with an aqueous solution of a salt of a second element having at least two oxidation states having a standard reduction potential lower than the standard reduction potential of the first element having at least two oxidation states to obtain the hollow nanoparticles.

This method allows the preparation of hollow nanoparticles of one single metal oxide or of mixtures of metal oxides according to the conditions in which the reaction is performed. Advantageously, the presence of the support allows the nanoparticles to be transformed via a process that does not involve the use of a surfactant, making it possible to apply the method of the invention also as post-treatment on existing materials, the properties of which can therefore be modified according to the intended use. Advantageously, furthermore, the fact that the reaction is conducted in an aqueous environment without the use of a surfactant allows acceleration of the reaction kinetics, promoting contact between the nanoparticles of the oxide of the first element having at least two oxidation states with the ions of the second element having at least two oxidation states. Furthermore, the absence of the surfactant allows performance of the galvanic replacement reaction also with metals whose reduction potential difference is very small, for example 0.15V, allowing the preparation of metal oxide nanoparticles otherwise not obtainable with the galvanic replacement reactions known in the art.

Lastly, advantageously, the absence of the surfactant makes the method of the invention inexpensive and environment-friendly.

In one embodiment, the support is selected from the group consisting of silica, carbon, alumina, zinc oxide, zirconium oxide, titanium dioxide, alkaline oxides, alkaline earth oxides.

In one embodiment, the oxide of the first element having at least two oxidation states is selected from the group consisting of $Mn_3O_4$, $MnO_2$, $Co_3O_4$, $Fe_3O_4$, $PbO_2$, $CeO_2$ and the salt of the second element having at least two oxidation states is a salt of a metal selected from the group consisting of Fe(II), Sn(II), V(III), Ti(III), Cr(II), Ce(III).

The difference between the standard reduction potential of the first element having at least two oxidation states and the standard reduction potential of the second element having at least two oxidation states is at least 0.15V.

Preferably, before bringing the suspension of metal oxide nanoparticles into contact with the aqueous solution of the salt, the suspension of nanoparticles is heated to a temperature ranging from 20 to 100° C., more preferably from 60 to 90° C. if a high replacement level is required, and from 20 to 40° C. if a low replacement level is required. Alternatively, the heating step can be performed after addition of the aqueous solution of the salt.

With the method of the invention it is possible to obtain both monometallic and polymetallic structures without altering the original spatial distribution of the oxide nanoparticles.

BRIEF DESCRIPTION OF THE DRAWINGS

The present invention will now be described in detail with reference to the figures of the accompanying drawings, wherein.

BEST MODE FOR CARRYING OUT THE INVENTION

Further characteristics of the present invention will be evident from the following description of some merely illustrative non-limiting examples.

Example 1

Preparation of Hollow Nanocatalysts of Au—$Mn_{3-x}Fe_xO_4/SiO_2$

The heterodimer nanoparticles of Au—MnO were synthesized as illustrated in J. Am. Chem. Soc. 2014, 136, 2473-2483.

2200 mg of $SiO_2$ are dispersed in 600 ml of hexane and subsequently a solution of heterodimer nanoparticles of Au—MnO in hexane (which contains 24 mg of Au) is added dropwise under stirring.

Figure 1:
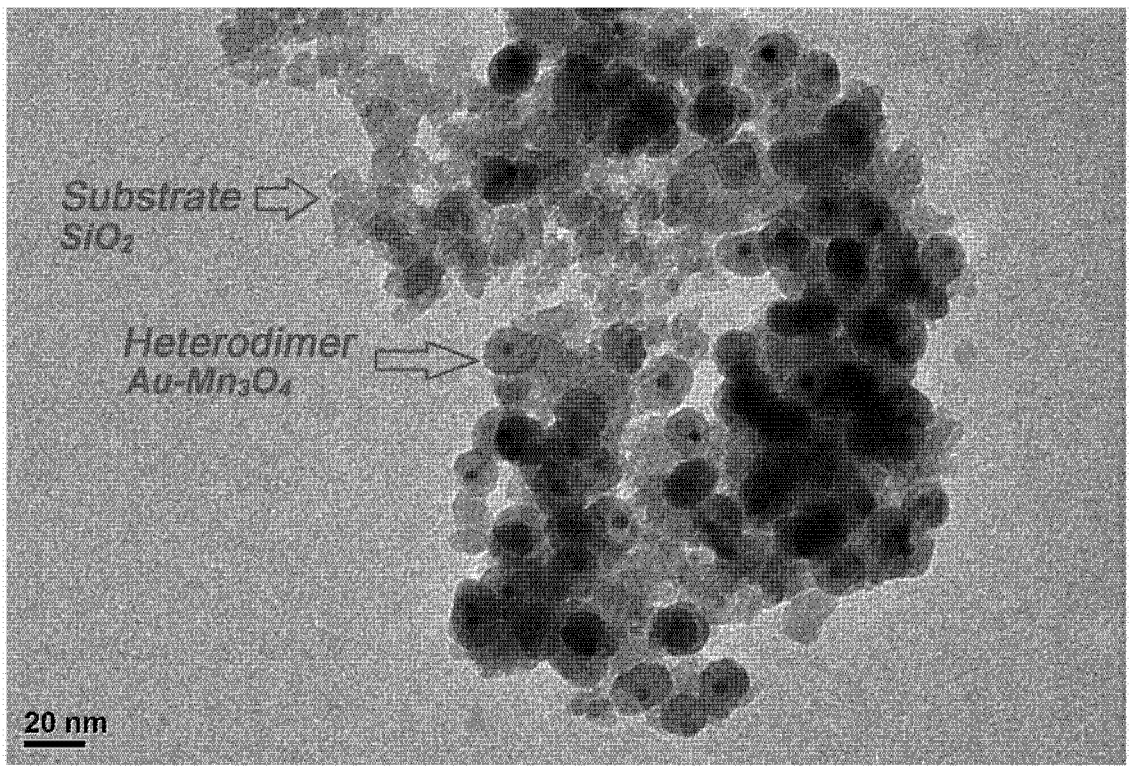
FIG. 1 illustrates a TEM image of nanocrystals of Au—$Mn_3O_4$ deposited on $SiO_2$ after a calcination phase as described in example 1.

The mixture is sonicated for 30 minutes, then the products are collected by centrifugation and dried at 60° C. for one night and calcined at 450° C. for 3 hours in static air with a heating speed of 5° C./min. Nanoparticles of Au—$Mn_3O_4$ are obtained supported on $SiO_2$ (FIG. 1).

300 mg of the calcined product Au—$Mn_3O_4/SiO_2$ are then dispersed in 150 ml of water by means of sonication. The mixture is heated to 90° C. for 15 minutes under stirring.

Figure 2:
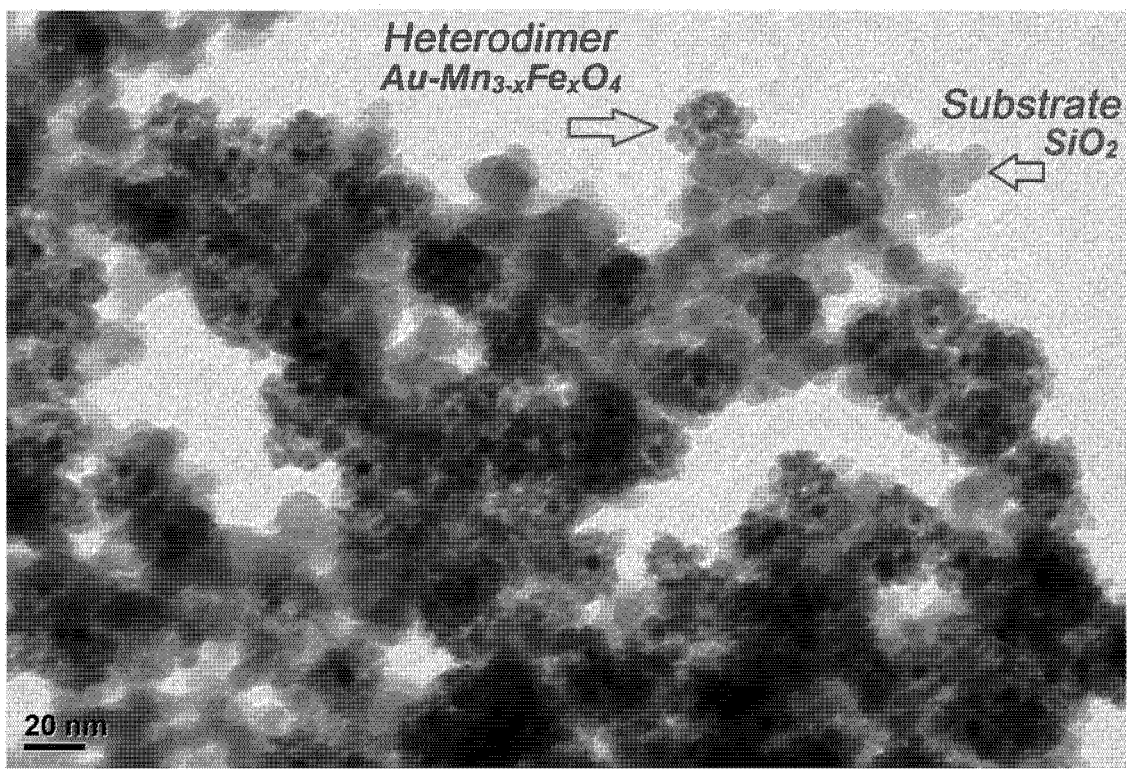
FIG. 2 illustrates a TEM image of hollow nanocrystals of Au—$Mn_xFe_yO_z$ (where [Fe]/[Fe]+[Mn]>99%) deposited on $SiO_2$ obtained as described in example 1.

An aqueous solution of $Fe(ClO_4)_2$ is added rapidly (successive experiments were repeated increasing the quantity of $Fe^{2+}$: 0.025, 0.05, 0.1, 0.2 or 5 mmoles of $Fe^{2+}$). After stirring for 90 min at 90° C., the product is collected by centrifugation and washed twice with water and once with ethanol. Hollow nanoparticles of Au—$Mn_{3-x}Fe_xO_4/SiO_2$ are obtained (FIG. 2). The sample is dried at 60° C. for one night and used as a heterogeneous catalyst for the oxidation of carbon monoxide. The galvanic replacement level can be controlled by acting on the quantity of $Fe^{2+}$ precursor. The replacement level of the end product is calculated as:

$$\frac{M_{Fe}}{(M_{Fe} + M_{Mn})}$$

where $M_{Fe}$ is the number of moles of Fe and $M_{Mn}$ is the number of moles of manganese in the end product in the suspension. When the replacement level is lower than 70%, it increases linearly with the increase in the quantity of the Fe(II). To reach a replacement level greater than 99%, an excess of $Fe^{2+}$ is required with respect to the theoretical stoichiometric value. Table 1 shows the data in terms of replacement level of the initial sample of Au—$Mn_3O_4$ supported on $SiO_2$ not subject to galvanic replacement (Au—$Mn_3O_4/SiO_2$) compared with those of the sample after galvanic replacement with increasing quantities of $Fe^{2+}$ (Au—$Mn_{3-x}Fe_xO_4/SiO_2$-GR1, Au—$Mn_{3-x}Fe_xO_4/SiO_2$-GR2, Au—$Mn_{3-x}Fe_xO_4/SiO_2$-GR3, Au—$Mn_{3-x}Fe_xO_4/SiO_2$-GR4, Au—$Mn_{3-x}Fe_xO_4/SiO_2$-GR5).

TABLE 1

|  | Fe2+ added | Au wt % | Mn wt % | Fe wt % | $M_{Fe}/(M_{Fe} + M_{Mn})$ |
|---|---|---|---|---|---|
| Au—Mn$_3$O$_4$/SiO$_2$ | 0 mmol | 0.92 | 4.42 | 0 | 0% |
| Au—Mn$_{3-x}$Fe$_x$O$_4$/SiO$_2$-GR1 | 5 mmol | 0.82 | 0.05 | 5.92 | 99.1% |
| Au—Mn$_{3-x}$Fe$_x$O$_4$/SiO$_2$-GR2 | 0.2 mmol | 1.04 | 1.54 | 3.32 | 67.9% |
| Au—Mn$_{3-x}$Fe$_x$O$_4$/SiO$_2$-GR3 | 0.1 mmol | 1.05 | 3.50 | 1.59 | 30.9% |
| Au—Mn$_{3-x}$Fe$_x$O$_4$/SiO$_2$-GR4 | 0.05 mmol | 0.90 | 3.52 | 0.78 | 17.9% |
| Au—Mn$_{3-x}$Fe$_x$O$_4$/SiO$_2$-GR5 | 0.025 mmol | 0.95 | 4.71 | 0.35 | 6.8% |

Figure 3:
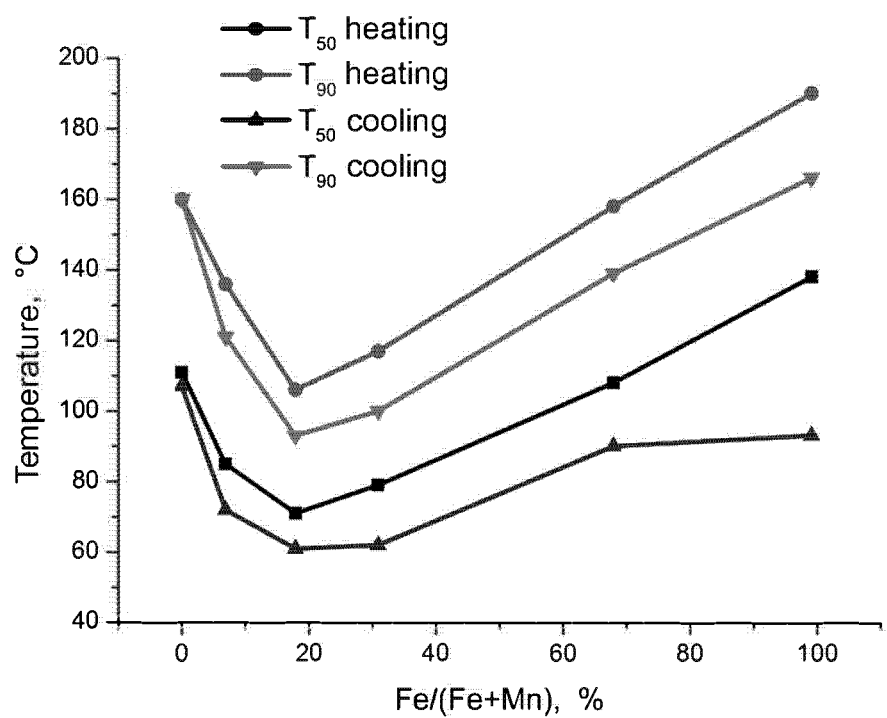
FIG. 3 illustrates the catalytic oxidation performance of the carbon monoxide of the materials obtained with the method according to example 1.

The catalytic performance of these materials in the oxidation of carbon monoxide varies with the replacement level. The T50 and T90 (temperatures for which 50% and 90% carbon monoxide conversion is achieved respectively) during the heating and cooling transients of the reaction process are shown in FIG. 3, as a function of the replacement level. The sample Au—Mn$_{3-x}$Fe$_x$O$_4$/SiO$_2$-GR4 with a replacement level of 18% has proved to be the most active catalyst with the lowest T50 and T90 of the materials tested.

The best performance of the catalyst is therefore obtained with nanoparticles having a replacement level of 18%.

Example 2

Preparation of Mn$_{3-x}$Fe$_x$O$_4$/SiO$_2$ Nanoparticles

The nanoparticles of Mn$_3$O$_4$ were synthesized as illustrated in Chem. Mater. 2009, 21, 2272-2279.

700 mg of SiO$_2$ are dispersed in 150 ml of hexane. A solution in hexane of nanoparticles of Mn$_3$O$_4$ (containing overall 80 mg of Mn$_3$O$_4$) is then added dropwise under stirring.

The mixture is sonicated for 30 minutes, then the products are collected by centrifugation, dried at 60° C. for one night and calcined at 350° C. for 2 hours under static air with a heating speed of 5° C./min. Nanoparticles of Mn$_3$O$_4$ supported on SiO$_2$ are obtained.

20 mg of the product obtained, Mn$_3$O$_4$/SiO$_2$ are dispersed in 10 ml of H$_2$O with sonication. The mixture is heated to different temperatures (Tamb, 40, 60, 90° C.) under stirring. 1 ml of an aqueous solution of Fe(ClO$_4$)$_2$ (0.0366 mmol) is then injected and left to react at the temperature for 90 min.

The product is collected and washed with water 3 times and then once with ethanol. The sample is dried at 60° C. for one night.

Figure 4:
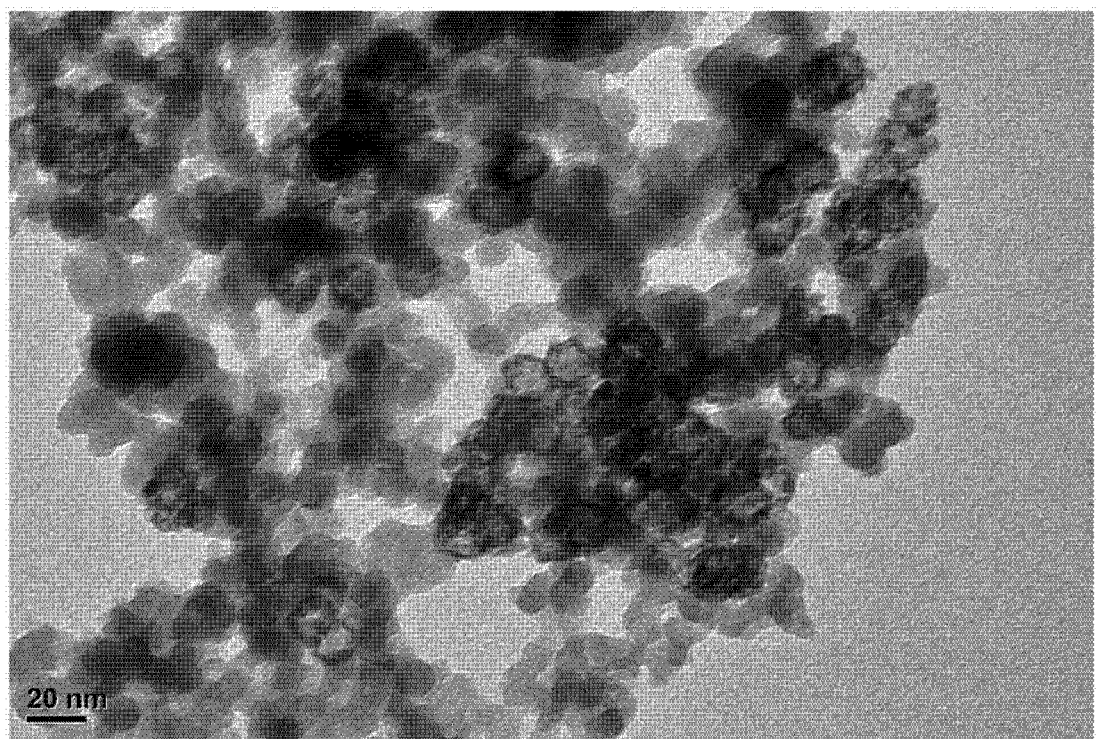
FIG. 4 illustrates a TEM image of hollow nanoparticles of $Mn_{3-x}Fe_xO_4/SiO_2$ obtained by carrying out the replacement reaction at 90° C. and with a replacement level $M_{Fe}/(M_{Fe}+M_{Mn})$=99.4%.
Figure 5:
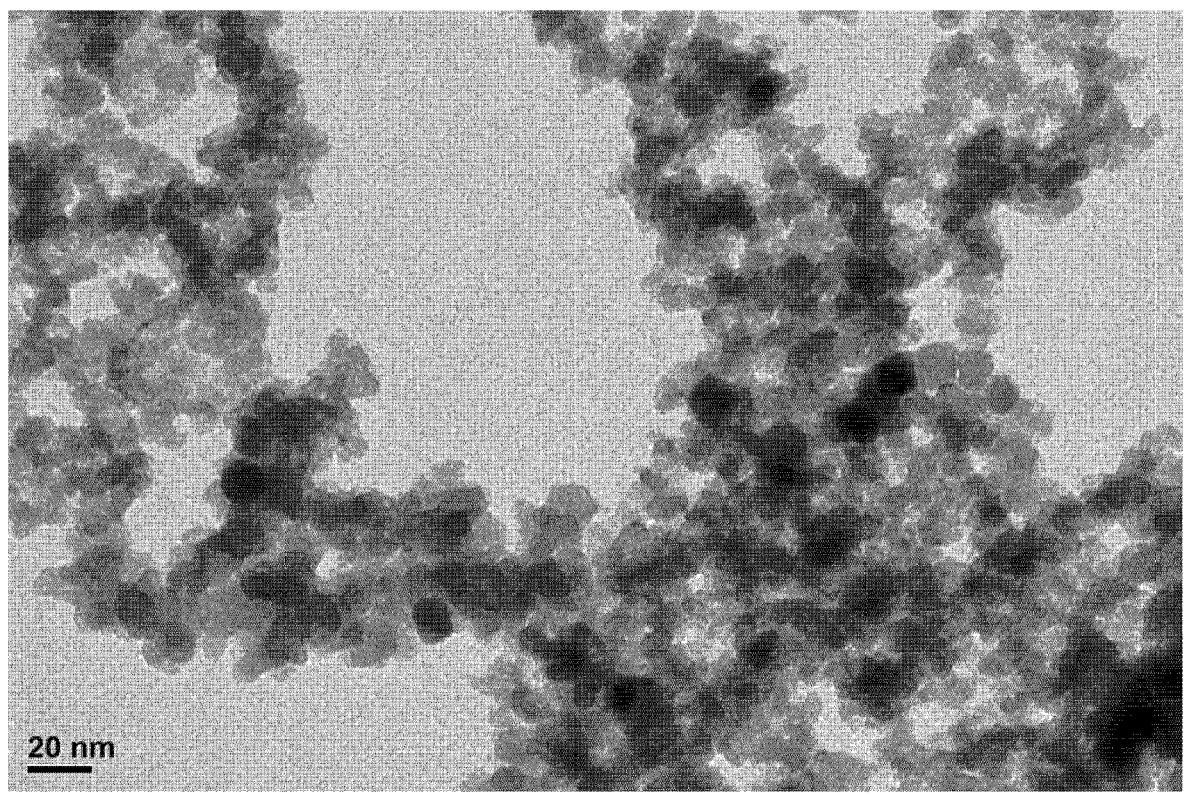
FIG. 5 illustrates a TEM image of hollow nanoparticles of $Mn_{3-x}Fe_xO_4/SiO_2$ obtained by carrying out the replacement reaction at 20° C. and with a replacement level $M_{Fe}/(M_{Fe}+M_{Mn})$ 35.7%.

The results in terms of replacement level are reported in table 2 and illustrated in FIGS. 4 and 5.

TABLE 2

|  | Mn | Fe | $M_{Fe}/(M_{Fe} + M_{Mn})$ |
|---|---|---|---|
| GR-90° C. | 0.02 wt % | 3.91 wt % | 99.5% |
| GR-60° C. | 0.19 wt % | 3.67 wt % | 95.0% |
| GR-40° C. | 1.81 wt % | 1.56 wt % | 45.9% |
| GR-20° C. | 1.70 wt % | 0.96 wt % | 35.7% |

GR-90° C.: sample Mn$_{3-x}$Fe$_x$O$_4$/SiO$_2$ obtained after heating to 90° C.;
GR-60° C.: sample Mn$_{3-x}$Fe$_x$O$_4$/SiO$_2$ obtained after heating to 60° C.;
GR-40° C.: sample Mn$_{3-x}$Fe$_x$O$_4$/SiO$_2$ obtained after heating to 40° C.;
GR-20° C.: sample Mn$_{3-x}$Fe$_x$O$_4$/SiO$_2$ obtained after heating to 20° C.

It should be noted that the replacement level can be modulated also according to the reaction temperature.

Example 3

Preparation of Nanoparticles of Mn$_{3-x}$Fe$_x$O$_4$/Carbon

Figure 6:
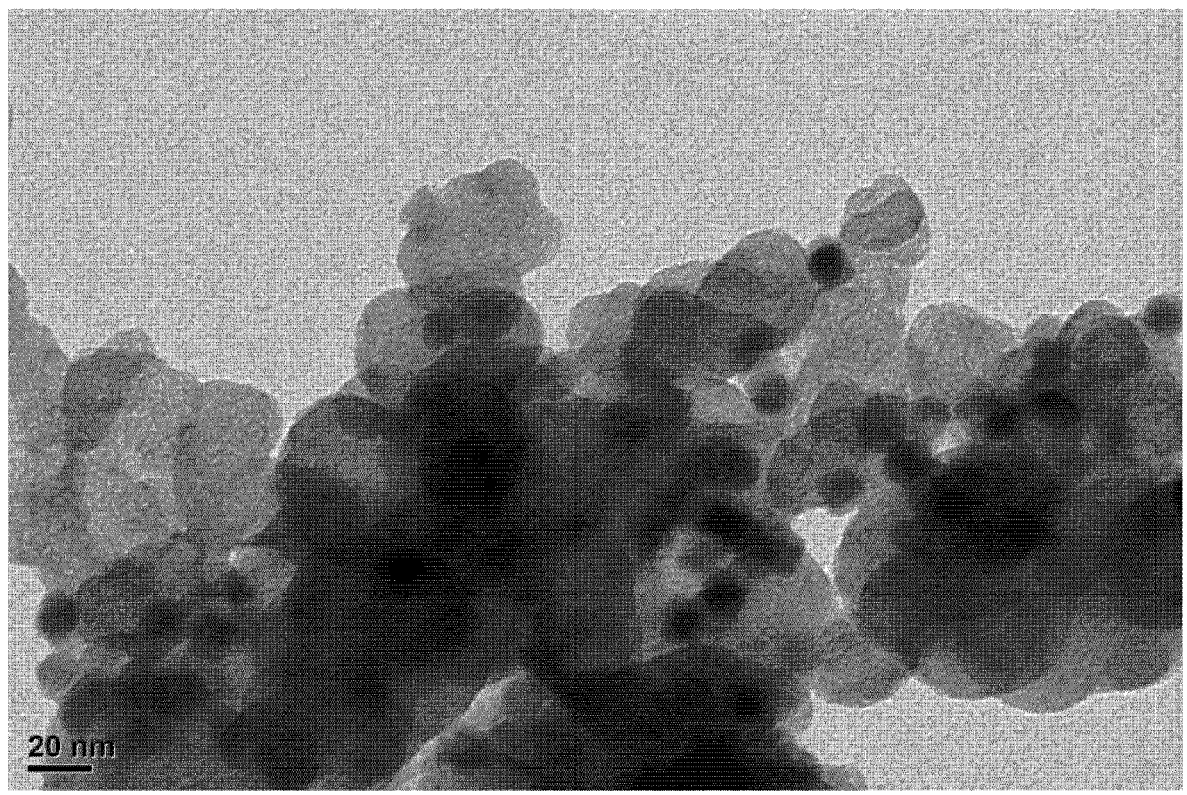
FIG. 6 illustrates a TEM image of nanoparticles of $Mn_3O_4$ deposited on a carbon support as described in example 3.

The synthesis of the nanoparticles of Mn$_3$O$_4$ and the procedures for deposition on the support are the same as those illustrated in example 2; for this experiment the silica support was replaced with a carbon support (FIG. 6).

After the deposition, no calcination was performed since calcination in air to remove the ligands would cause a significant loss of material (during heating not only the ligands are lost but partially also the carbon).

Figure 7:
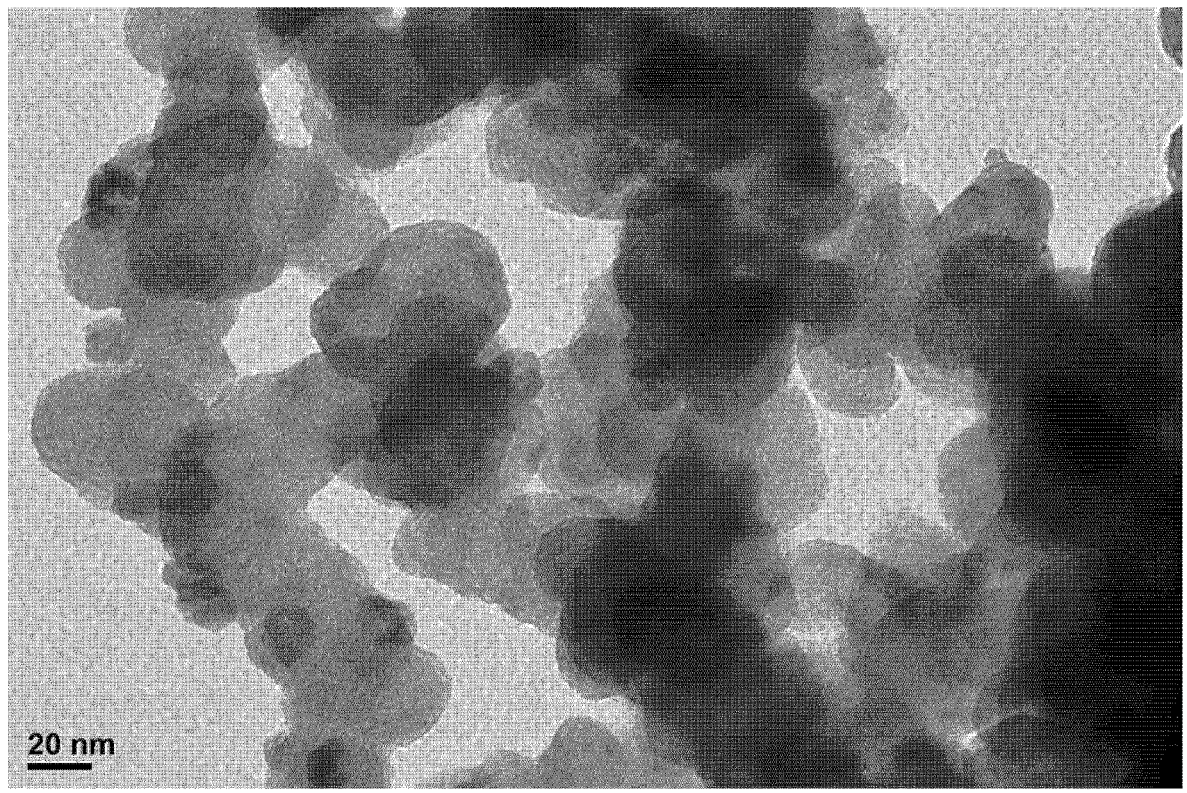
FIG. 7 illustrates a TEM image of hollow nanoparticles of $Mn_{3-x}Fe_xO_4$/carbon obtained at 90° C. as illustrated in example 3 and with a replacement level $M_{Fe}/(M_{Fe}+M_{Mn})$=99.0%.
Figure 8:
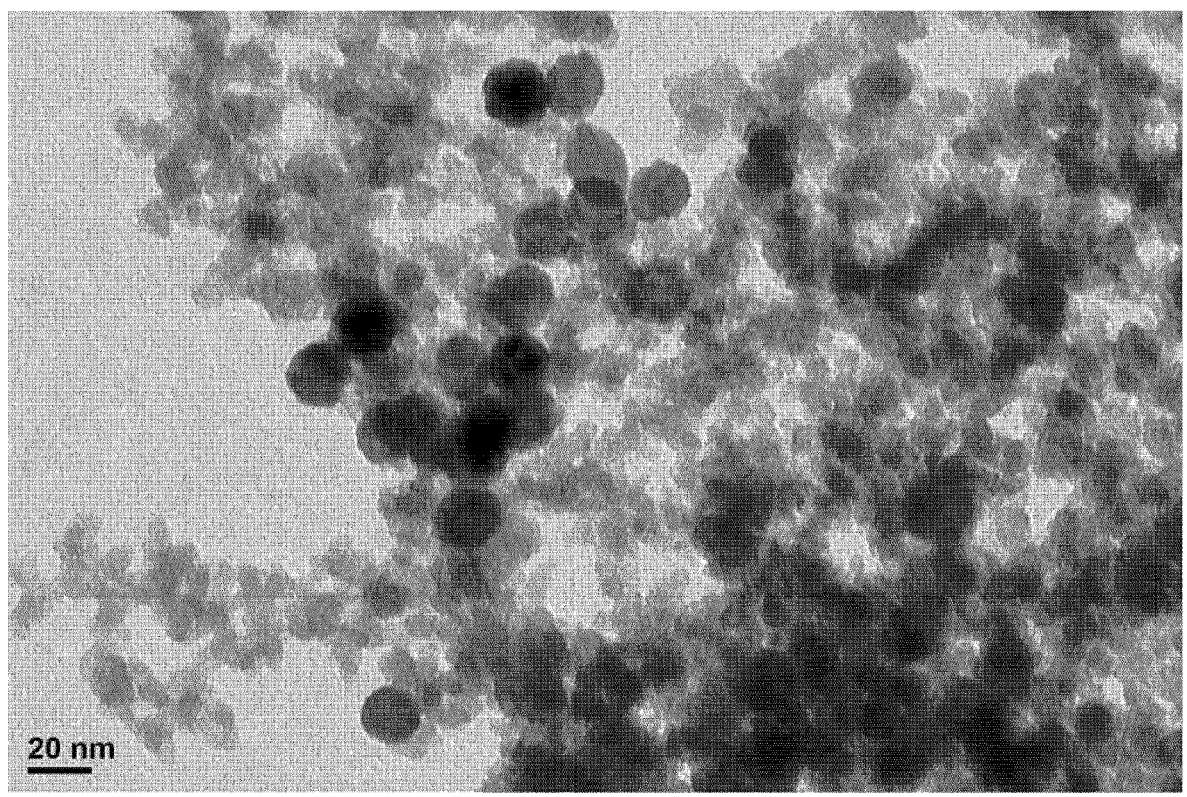
FIG. 8 illustrates a TEM image of nanoparticles of $Mn_3O_4$ deposited on a support of $SiO_2$ as described in example 4.
Figure 9:
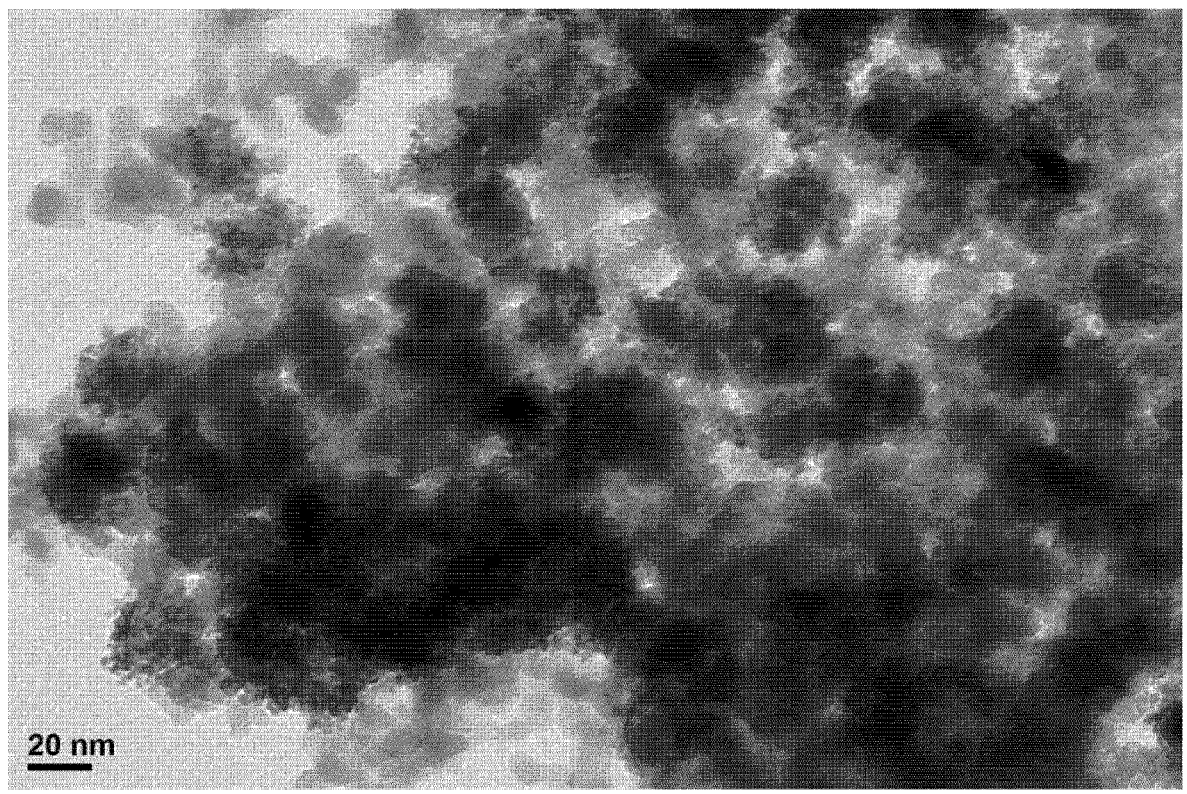
FIG. 9 illustrates a TEM image of hollow nanoparticles of $Mn_{3-x}Ce_xO_4/SiO_2$ obtained at 90° C. as illustrated in example 4 and with a replacement level $M_{Ce}/(M_{Ce}+M_{Mn})$=23.5%.

The galvanic replacement procedures carried out are the same as those of example 2 (FIG. 7).

It can be noted that the use of a different support does not affect the method subject of the invention.

Example 4

Preparation of Mn$_{3-x}$Ce$_x$O$_4$/SiO$_2$ nanoparticles 20 mg of nanoparticles of MnO were synthesized according to the procedure reported in Chem. Mater. 2009, 21, 3183-3190.

The deposition procedures are the same as those used in example 1.

The powders obtained are dried at 60° C., then calcined at 450° C. for 3 hours in air to remove the ligands and to oxidize the MnO to Mn$_3$O$_4$.

20 mg of the product obtained, Mn$_3$O$_4$/SiO$_2$ are dispersed in 10 ml of H$_2$O by means of sonication and the suspension is heated to 90° C. under stirring. 1 ml of an aqueous solution of CeCl$_3$ (0.5 mmol) is then injected and left to react at constant temperature for 90 min. The product obtained is collected and washed with water three times and with ethanol once. Subsequently the product is dried at 60° C. for one night.

Example 5

Preparation of Mn$_{3-x}$Sn$_x$O$_4$/SiO$_2$ Nanoparticles 20 mg of nanoparticles of MnO were synthesized according to the procedure reported in Chem. Mater. 2009, 21, 3183-3190.

The deposition procedures are the same as those used in example 1.

The powders obtained are dried at 60° C., then calcined at 450° C. for 3 hours in air to remove the ligands and to oxidize the MnO to Mn$_3$O$_4$.

Figure 10:
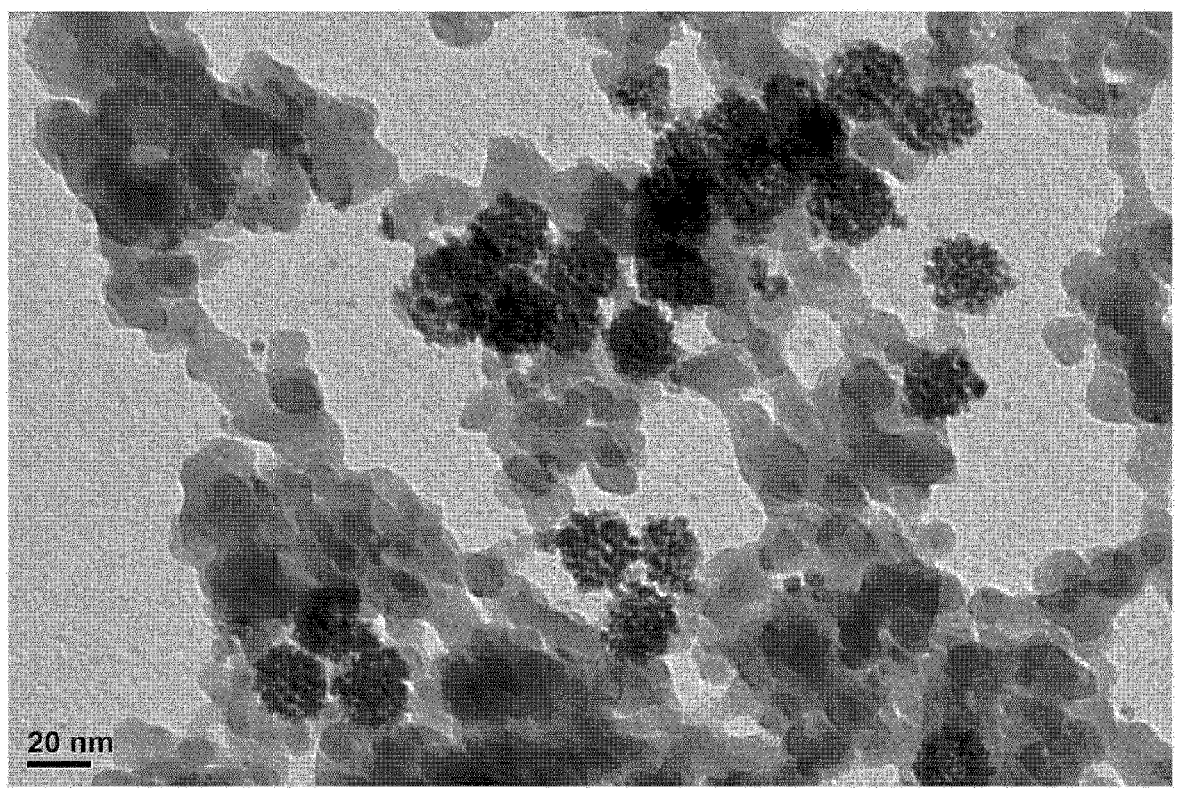
FIG. 10 illustrates a TEM image of hollow nanoparticles of $Mn_{3-x}Sn_xO_4/SiO_2$ obtained as illustrated in example 4.

20 mg of the product obtained, $Mn_3O_4/SiO_2$ are dispersed in 10 ml of $H_2O$ by means of sonication and the suspension is heated to 90° C. under stirring. 1 ml of an aqueous solution of $SnCl_2$ (0.005 mmol $SnClO_2$ and 0.1 ml HCl) is then injected, and left to react at constant temperature for 90 min. The product obtained is collected and washed with water three times and with ethanol once. Subsequently the product is dried at 60° C. for one night (FIG. 10).

The replacement level data are reported in table 3.

TABLE 3

|  | Mn (% by weight) | Sn (% by weight) |
|---|---|---|
| Starting material ($Mn_3O_4/SiO_2$) | 2.41 | 0 |
| Material after galvanic replacement ($Mn_{3-x}Sn_xO_4/SiO_2$) | 0 | 0.76 |

Example 6

Comparison Between the Nanoparticles Obtained with the Method of the Invention and the Nanoparticles Obtained According to the Known Art.

The nanoparticles obtained with the method of the invention were produced as described in example 2.

In particular, the nanoparticles of $Mn_3O_4$ were synthesized as illustrated in Chem. Mater. 2009, 21, 2272-2279.

The $SiO_2$ support is dispersed in hexane. A solution in hexane of nanoparticles of $Mn_3O_4$ is then added dropwise under stirring.

The mixture is sonicated for 30 minutes, then the products are collected by centrifugation, dried at 60° C. for one night and calcined at 350° C. for 2 hours under static air with a heating speed of 5° C./min. Nanoparticles of $Mn_3O_4$ supported on $SiO_2$ are obtained.

200 mg of the product obtained, $Mn_3O_4/SiO_2$ (containing approximately 3.08% by weight of Mn) are dispersed in 100 ml of $H_2O$ with sonication. The mixture is heated to 90° C. under stirring. An aqueous solution of $Fe(ClO_4)_2$ is then injected (successive experiments were repeated increasing the quantity of $Fe^{2+}$: 0.0118, 0.0235, 0.047, 0.086, 0.133 mmol $Fe^{2+}$) and left to react at the temperature for 90 min.

The product is collected and washed with water 3 times and then once with ethanol. The sample is dried at 60° C. for one night.

Figure 11:
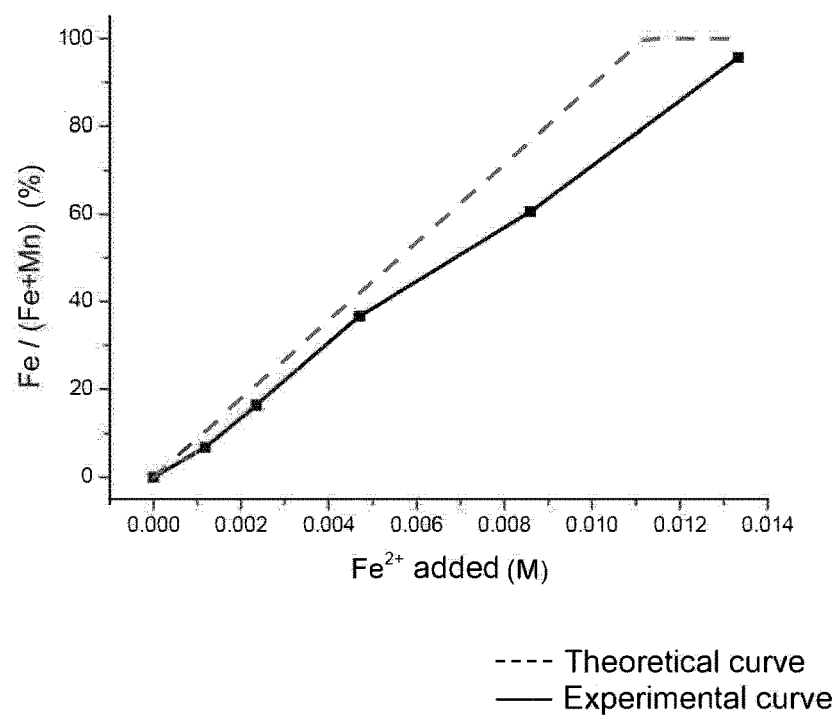
FIG. 11 illustrates the trend of the replacement level as a function of the quantity of $Fe^{2+}$ in the formation of nanoparticles of $Mn_{3-x}Fe_xO_4/SiO_2$.

The results in terms of replacement level are reported in FIG. 11.

Comparing the data obtained with the data reported in Oh et al., "Galvanic Replacement Reactions in Metal Oxide Nanocrystals", Science (2013) 340, 964-968, FIG. 1E, it can be noted that the method according to the invention allows a replacement level to be obtained comparable to much lower concentrations with respect to those used in this known art document.

In particular, the concentrations compared are the following:

|  | Quantity of Mn | Solvent | Quantity of $Fe^{2+}$ | Concentration of $Fe^{2+}$ (for a theoretical replacement of 100%) |
|---|---|---|---|---|
| Ho et al. | 1 mmol Mn | 15 ml xylene | 1 ml $Fe^{2+}$ | 1.0 M |
| Sample according to the invention | 200 mg $MnOx/SiO_2$ with ~3.08% by weight Mn (i.e. 0.112 mmol Mn) | 100 ml $H_2O$ | 10 ml $Fe^{2+}$ | 0.0112 M |

It follows that the method according to the invention allows optimization of the galvanic replacement reaction kinetics with respect to the methods known in the art.

REFERENCES

[1] Oh et al., "Galvanic Replacement Reactions in Metal Oxide Nanocrystals", Science (2013) 340, 964-968;
[2] Zhang et al., "Self-templated synthesis of hollow nanostructures" Nano Today (2009) 4, 494-507;
[3] Wang et al., "Surfactant-free synthesis of Cu2O hollow spheres and their wavelength-dependent visible photocatalytic activities using LED lamps as cold light sources", Nanoscale Research Letters (2014), 9:624.

The invention claimed is:

1. A method for the preparation of metal oxide hollow nanoparticles comprising the steps of:
   providing an aqueous suspension of nanoparticles of an oxide of a first element having at least two oxidation states coupled with a substrate;
   placing in contact said aqueous suspension with an aqueous solution of a salt of a second element having at least two oxidation states having a standard reduction potential lower than the standard reduction potential of said first element to obtain said metal oxide hollow nanoparticles.

2. The method according to claim 1, characterized in that said oxide of said first element having at least two oxidation states is selected from the group consisting of $Mn_3O_4$, $MnO_2$, $Co_3O_4$, $Fe_3O_4$, $PbO_2$, and $CeO_2$.

3. The method according to claim 1, characterized in that said salt of said second element having at least two oxidation states is a salt of a metal selected from the group consisting of Fe(II), Sn(II), V(III), Ti(III), Cr(II), and Ce(III).

4. The method according to claim 1, characterized in that the difference between the standard reduction potential of said first element having at least two oxidation states and the standard reduction potential of said second element having at least two oxidation states is at least 0.15 V.

5. The method according to claim 1, characterized in that the aqueous suspension of nanoparticles is heated to a temperature ranging from 20 to 100° C.

6. The method according to claim 1, characterized in that said substrate is selected from the group consisting of silica, carbon, alumina, zinc oxide, zirconium oxide, titanium dioxide, alkaline oxides, and alkaline earth oxides.

* * * * *